United States Patent
Ookawa (10) Patent No.: US 10,396,459 B2
(45) Date of Patent: Aug. 27, 2019

(54) RADAR APPARATUS AND CONTROLLING METHOD THEREOF

(71) Applicant: DENSO CORPORATION, Kariya, Aichi-pref. (JP)

(72) Inventor: Kunihiko Ookawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 430 days.

(21) Appl. No.: 15/039,028

(22) PCT Filed: Oct. 10, 2014

(86) PCT No.: PCT/JP2014/077130
§ 371 (c)(1),
(2) Date: May 24, 2016

(87) PCT Pub. No.: WO2015/079812
PCT Pub. Date: Jun. 4, 2015

(65) Prior Publication Data
US 2017/0170560 A1    Jun. 15, 2017

(30) Foreign Application Priority Data
Nov. 26, 2013  (JP) ................................ 2013-244025

(51) Int. Cl.
*H01Q 3/38* (2006.01)
*G01S 7/35* (2006.01)
(Continued)

(52) U.S. Cl.
CPC ............... *H01Q 3/38* (2013.01); *G01S 7/038* (2013.01); *G01S 7/35* (2013.01); *G01S 13/93* (2013.01); *G01S 13/931* (2013.01); *G01S 7/032* (2013.01)

(58) Field of Classification Search
CPC .............. H01Q 3/38; G01S 7/038; G01S 7/35
(Continued)

(56) References Cited

U.S. PATENT DOCUMENTS

| 2010/0214159 A1* | 8/2010 | Ookawa ................. G01S 7/038 342/202 |
| 2012/0098698 A1* | 4/2012 | Reuter ..................... G01S 7/03 342/200 |
| 2012/0105300 A1 | 5/2012 | Ando et al. |

FOREIGN PATENT DOCUMENTS

| JP | 07229958 A | * | 8/1995 |
| JP | H07229958 A | | 8/1995 |

* cited by examiner

*Primary Examiner* — Peter M Bythrow
*Assistant Examiner* — Helena H Seraydaryan
(74) *Attorney, Agent, or Firm* — Knobbe, Martens, Olson & Bear, LLP (57) ABSTRACT

A vehicle-mounted radar apparatus includes transmission antenna members and a transmitting section provided with an oscillator and phase shifters, a controller, a reception antenna member, and a receiving section. The transmission antenna members transmit radar waves. The oscillator generates radio waves necessary to transmit the radar waves. Each phase shifters changes a phase of the radio waves generated at the oscillator and supplies the phase-shifted radio waves to a corresponding one of the transmission antenna members. The controller controls the phase shifter. The reception antenna member receives reflected waves of the of the radar waves. The receiving section generates a reception signal including the reflected waves that are received through the reception antenna member. For the noise reduction process, the controller controls the phase control, so that, of the received signals generated at the receiving section, a first leak component indicating reflected waves from objects other than a target detected outside the (Continued)

vehicle is subtracted from the received signals by using a second leak component indicating the radio wave leaking from the transmitting section to the receiving section.

7 Claims, 5 Drawing Sheets

(51) Int. Cl.
*G01S 7/03* (2006.01)
*G01S 13/93* (2006.01)

(58) Field of Classification Search
USPC .......................................................... 342/83
See application file for complete search history.

RADAR APPARATUS AND CONTROLLING METHOD THEREOF

CROSS-REFERENCE TO RELATED APPLICATION

This application is based on and claims the benefit of priority from earlier Japanese Patent Application No. 2013-244025 filed Nov. 26, 2013, the descriptions of which are incorporated herein by reference.

BACKGROUND

Technical Field

The present invention relates to a radar apparatus mounted on a vehicle and a method for controlling the radar apparatus.

Background Art

Conventionally, a radar apparatus is mounted on a vehicle and is used as a part of a safety device, for example, for collision avoidance. As an antenna for this type of radar apparatus, for example, there has been used a planar antenna which has a pattern for a transmission antenna (herein, referred to as a "transmission antenna member") and a pattern for a reception antenna (herein, referred to a "reception antenna member") both of which are formed on a substrate.

With this type of antenna, however, it is difficult to sufficiently obtain isolation between the transmission and the reception systems therein. That is, there is a possibility of radar waves that are transmitted from the transmission antenna member is partly received directly at the reception antenna member and thus generating unwanted detoured noise.

Further, there is also proposed a technique of installing a dividing wall to suppress noise leaking from the transmission antenna member on to the reception antenna member in a radome covering a face of the substrate antenna (for example, refer to Patent literature 1). With this technique, isolation between the transmission and the reception of a radar apparatus is improved.

CITATION LIST

Patent Literature

[Patent Literature 1] JP-A 2012-93305.

Technical Problem

In the conventional radar apparatus, however, the radar waves that are emitted externally from the transmission antenna member through the radome antenna member are not suppressed from being received as noise (herein, referred to as reflection noise) at the reception antenna member, in which such radar waves are reflected from, for example, part of the vehicle, such as the bumper. There is a concern that such reflected noise is detected as reflected waves from a target (other vehicle) outside the vehicle, resulting in an erroneous operation of a safety device.

In addition, there is another drawback with a demand for the miniaturization of the radar apparatus. Specifically, such demand requires that, for example, the transmitting circuit that generates sufficient radio waves for transmitting the radar waves and the reception circuit to generate received signals containing the reflected waves received through the reception antenna member are arranged on the same substrate. In this case, a DC (direct current) level of a received signal increases and the dynamic range is restricted by radio waves leaking from the transmitting circuit onto the reception circuit (herein, referred to as "transmission-to-reception leakage").

SUMMARY

In view of the circumstances described above, it is thus desired to provide a radar apparatus and a control method thereof, which are capable of efficiently suppressing the effect of reflection noise and transmission-to-reception leakage.

An exemplary embodiment is a radar apparatus mounted on a vehicle. The radar apparatus is provided with transmission antenna members which transmit radar waves, a transmitting member provided with an oscillator and phase shifters, controlling means for controlling the phase shifters, a reception antenna member which receives waves reflected from the radar waves, and a receiving section which generates a receiving signal containing the reflected waves received through the reception antenna members.

The oscillator generates radio waves necessary to transmit the radar waves. The phase shifters change a phase of the radio waves generated at the oscillator and supply the phase-shifted radio waves to the transmission antenna members.

The controlling means controls the phases of the radio waves such that, of the received signals generated at the receiving section, a first leak component is subtracted from the received signals by using a second leak component, where the first leak component refers to reflected waves from an object other than targets detected outside the vehicle and the second leak component refers to radio waves leaking from the transmitting section to the receiving section.

In this configuration, for example, the phases of the radio waves from the oscillator are changed until, of the received signals, the first leak component (reflection noise) and the second leak component (transmission-to-reception leakage) are added together to be cancelled out from each other. Thus, individual measures are not taken for the reflection noise and the transmission-to-reception leakage, but both problems described can be resolved at the same time.

According to the exemplary embodiment, the adverse effect of the reflection noise and transmission-to-reception leakage can therefore be sufficiently suppressed relative to each other.

In the exemplary embodiment, for example, the controlling means extracts the first leak component and the second leak component individually by switching on and off operations of the phase shifter. The phase control of the radio waves may be performed such that the extracted first and second leak components are phase reversed.

In this configuration, for example, the second leak component (transmission-to-reception leakage) is extracted by switching off the operation of the phase shifter. Subsequently, the first leak component (reflection noise) is extracted based on both the previously extracted second leak component and the first and second leak components that are extracted by switching on the operation of the phase shifter. It is thus possible to generate the transmission-to-reception leakage that is phase-reversed to the reflection noise.

According to the exemplary embodiment, the phase control is performed based on previously-extracted known reflection noise. Hence, there is less need to repeatedly change the phases of the radio waves until the reflection noise and the transmission-to-reception leakage are added together so as to be cancelled out from each other, whereby the control time (i.e., time necessary for the control) can be reduced.

In the exemplary embodiment, the radar apparatus is provided with the transmission antenna member having the plurality of antenna elements. Alternatively, the transmitting section may be further provided with (i) a plurality of phase shifters that are connected to the plurality of antenna elements respectively and (ii) distributing means. The distributing means distributes the radio waves generated at the oscillator to the plurality of antenna elements through the plurality of respective phase shifters. In this configuration, the controlling means can set phase differences for the radio waves processed in the plurality of phase shifters.

In this configuration, the phase differences for the radar waves transmitted from the respective plurality of antenna elements are fixed at set values, during which the phase of each of the radio waves is changeable. Therefore, the direction of the transmission antenna member can be optionally changed whilst suppressing the effect of the reflection noise and the transmission/reflection leak, resulting in an emission range of the radar waves that is desirably adjustable.

BRIEF DESCRIPTION OF DRAWINGS

In the accompanying drawings:

FIG. 4, (a) thereof, shows a diagram exemplifying a reception waveform provided before a FFT (Fast Fourier Transformation) process and FIG. 4, (b) thereof, shows a diagram exemplifying a frequency spectrum provided after the FFT process; and FIG. 5, (a) thereof, shows a diagram exemplifying a phase difference between a component of a reflection noise and a component of a transmission-to-reception leakage of the reception waveform and FIG. 5, (b) thereof, shows a diagram exemplifying a state where a phase difference between the component of the reflection noise and the component of the transmission-to-reception leakage is 180° (phase reversed).

DESCRIPTION OF EMBODIMENTS

Hereinbelow, A radar apparatus 1 will be described as an embodiment of the present invention with reference to the drawings.

The present invention is not limited to the embodiment described below. The present invention can be performed in further modes where parts of the embodiment described below are omitted as long as the problem addressed by the invention is resolved. The present invention may be embodied in various other forms without departing from the scope of the present invention that is specified by the claims. The symbols used in the embodiment are also adopted accordingly for the claims for simplification thereof, but do not intend to limit the technical range of the preset invention set forth in each claim.

<Overall Configuration>

The radar apparatus 1 according to the embodiment is mounted on a vehicle transmits and receives radar waves in a millimeter wave range (for example 76.5 GHz). Hence the radar apparatus 1 is able to obtain information indicative of target objects which reflect the radar waves outside the vehicle. Such targets are, for example, other vehicles such as a preceding vehicle, obstacles on the road, and/or obstacles on the road side, which are referred simply to as "target" in the following description, and information indicative of such targets is, for example, a distance, a relative speed and/or an azimuth to and of each target.

Figure 1:
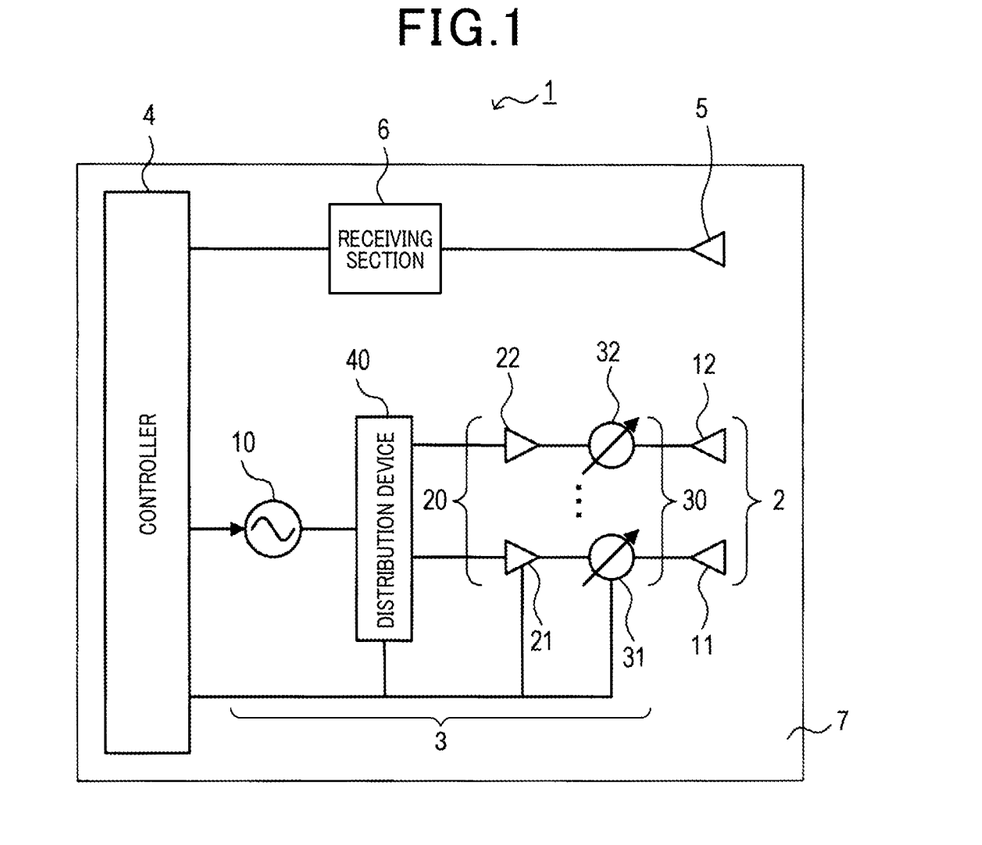
FIG. 1 is a diagram showing an overall configuration of a radar apparatus according to an embodiment.

As shown in FIG. 1, the radar apparatus 1 is provided with a transmission antenna member 2, a transmitting section 3, a controller 4 providing controlling means, a reception antenna member 5 and a receiving section 6, where the elements 2 to 6 are arranged on a common substrate.

The transmission antenna member 2 and the reception antenna member 5 are configured in such a manner that patterns used as a transmission antenna and a reception antenna are formed on the substrate 7. For example, in a case where the pattern of the transmission antenna member 2 and the pattern of the reception antenna member 5 are formed on the same face of the substrate 7 with a predetermined gap therebetween, a radome may be installed to provide a dividing wall between both patterns (such as a case which is referred to the foregoing patent reference 1).

The transmission antenna member 2 is a section from which the radar waves are transmitted, and is provided with a plurality of antenna elements 11 and 12. Each of the plurality of antenna elements 11 and 12 is composed of an aperture face antenna such as a horn antenna, or a planar antenna such as a patch antenna. The antenna elements 11 and 12 are arranged parallel with each other in such a manner that an equal distance is provided between mutually adjacent elements.

The transmitting section 3 is provided with an oscillator 10, an amplifier 20, a phase shifter 30 and a distribution device 40, where each of the devices 10, 20, 30 and 40 is controlled by the controller 4.

The oscillator 10 is a device that generates necessary radio waves for radar wave transmission. High frequency signals produced by, for example, a klystron, a travelling wave tube, a magnetron, a Gunn diode or others, are outputted as radio waves having frequencies which are stable in a millimeter wave range, using an automatic frequency control circuit.

The amplifier 20 (21, 22) is a device that amplifies the power of the radio waves outputted from the oscillator 10, where a plurality of amplifiers are provided in accordance with the number of antenna elements 11 and 12.

The phase shifter 30 (31, 32) is a device for changing the direction of a radio wave outputted from the oscillator 10, and a plurality of phase shifters are provided in accordance with the number of antenna elements 11 and 12. In the present embodiment, the phase shifter 30 is connected to each of the plurality of antenna elements 11 and 12, one by one. By the phase shifter 30, the phase of the radio wave outputted from the oscillator 10 is changed in relation with each of the antenna elements 11 and 12, and amplified radio waves which are amplified in electrical power by the amplifier 20 is supplied to the transmission antenna member 2. As the phase shifter 30, a line switching type phase shifter having a PIN (p-intrinsic-n) diode or a reflection type phase shifter having a GaAsFET is used.

The distribution device 40 is a device that distributes radio waves generated at the oscillator 10, to the plurality of antenna elements 11 and 12, respectively, through the plurality of amplifiers 21 and 22 and the phase shifters 31 and 32.

The reception antenna member 5 serves as a device that receives reflection waves of the radar wave, and may be provided with one antenna element or a plurality of antenna elements.

The receiving section 6 is a section that generates receiving signals including the reflection waves received through the reception antenna member 5. Specifically, the receiving section 6 is configured such that the receiving section 6 amplifies an analogue signal inputted from the reception antenna member 5, performs the sampling of the amplified analogue signal and converts it to a digital signal (digital data).

The controller 4 is provided to control each of the device 10 to 40 of the transmitting section 3, as well as captured digital data (i.e., sampling data) that is converted at the receiving section 6, and calculates target information by performing a signal processing based on the sampling value. As the controller 4, a microcomputer, for example, having a CPU (Central Processing Unit), ROM (Read Only Memory), RAM (Random Access Memory), is used.

The controller 4 performs a signal process which includes a noise reduction process in order to suppress the effect of reflection noise caused in this signal process and the transmission-to-reception leakage described below.

In the present embodiment, the reflected noise is where a radar wave emitted externally from the transmission antenna member 2 reflects from, for example, the bumper of the vehicle and inside the vehicle (from an object other than the target). The reflected wave is received at the reception antenna member 5, and as a result, becomes noise sampled at receiving section 6. Additionally, the transmission-to-reception leakage refers to a leaking radio wave that leaks externally (without going through the reception antenna member 2) with the generation of radio waves at the oscillator 10, and is sampled as noise at the reception section 6 (without going through the reception antenna member 5).

<Noise Reduction Process>

Figure 2:
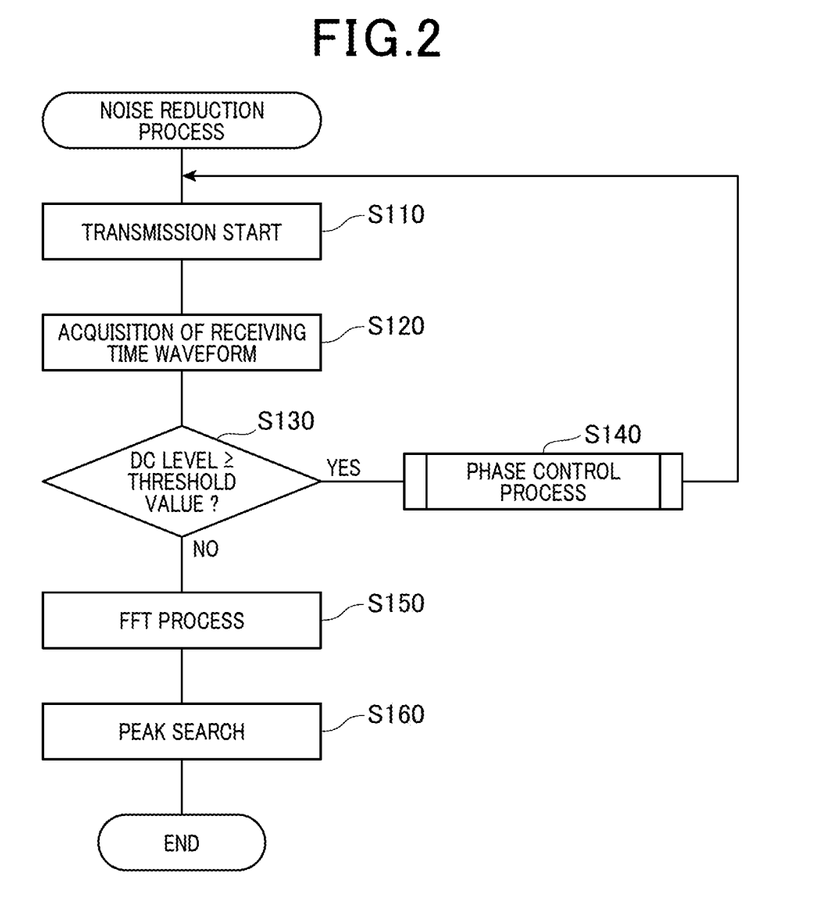
FIG. 2 is a flowchart exemplifying contents of a noise reduction process performed by a controller configured as controlling means of the radar apparatus shown in FIG. 1.

Next, a noise reduction process performed by the controller 4 is described with reference to FIG. 2. The noise reduction process is performed when the CPU detects a predesignated trigger, based on a program recorded in a memory, for example, of the ROM. The trigger can be actualized, for example, by inputting a performance indicator for the process that is performed by the operation of an inspector at a point of installing the radar apparatus in the vehicle, when the vehicle is produced at the time of shipping. In addition, the trigger can be detected due to a change in the external environment, for example, a temperature change, and can be also detected due to no target being detected in the signal process.

When this process is initiated, the controller 4 (specifically the CPU hereon) starts the transmission of the radar waves (step S110) by outputting a command to generate radio waves necessary to transmit the radar waves, in response to the oscillator 10 of the transmitting section 3. Note that the radar wave is transmitted at a pre-established transmission period. The transmission period is sufficiently shorter than the time required for the radar wave to be received after being reflected from target.

Figure 4:
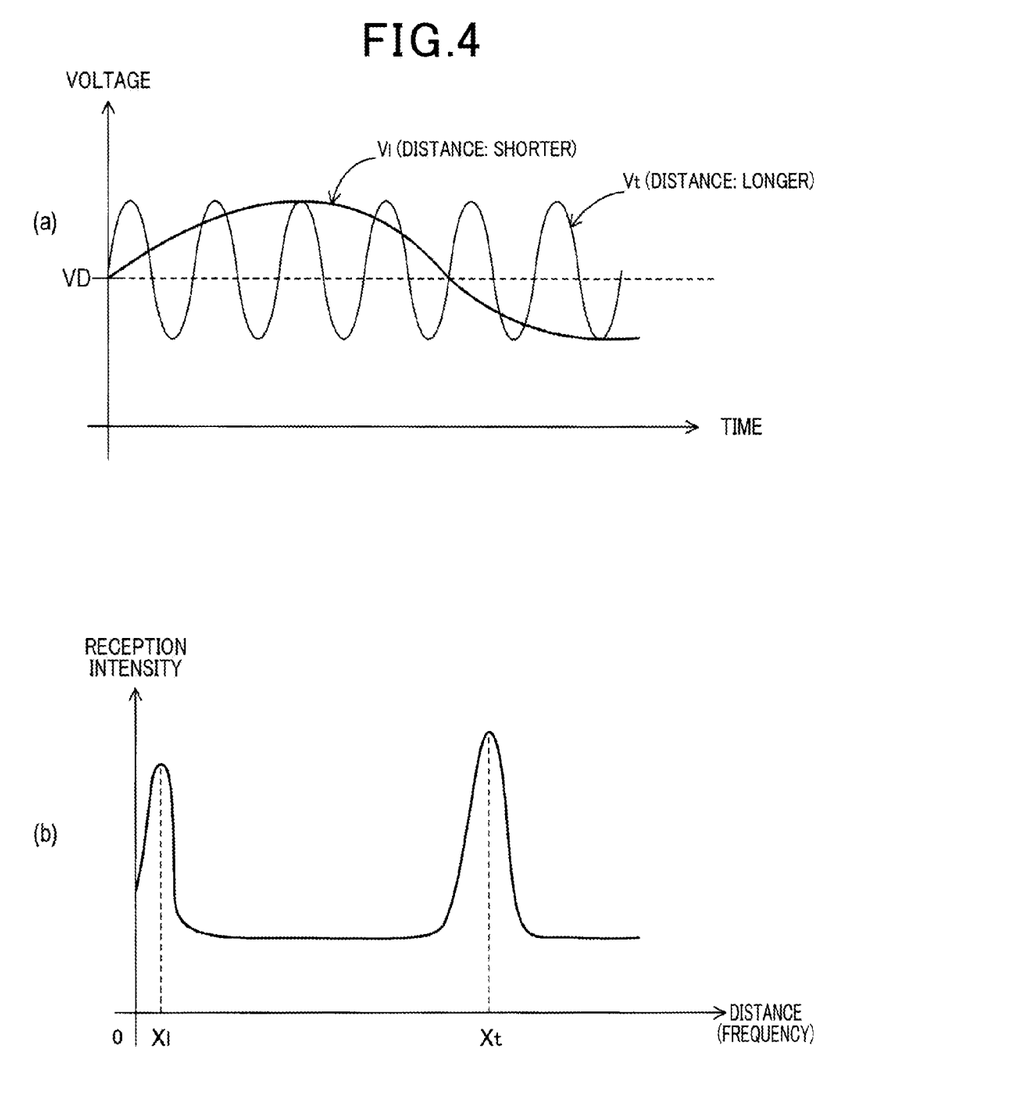

The controller 4 acquires the reception waveform by reading the digital data converted at the receiving section 6 and the reception time (temporal) waveform is obtained by graphing sampling values indicated by the digital data (step S120). Note that the reception waveform is an AC (alternating current) waveform where the horizontal axis is time, and the vertical axis is voltage (sampling value). In addition, the shorter the distance from the reception antenna member 5 to the reception waveform, the longer a period of the waveform becomes, in contrast, the longer the distance from the reception antenna 5, the shorter the period of the waveform (refer to FIG. 4 (*a*)).

Next, at step 120, the controller 4 determines whether or not a DC level of the reception waveform acquired is higher than pre-established threshold value (step S130). At this step, if the DC level is determined to be higher than the threshold value (S130; YES), a phase control process that changes the phase of the phase shifters 31 and 32 connected to the antenna elements 11 and 12, respectively, is performed (step S140). The controller 4 then returns to step S110. The threshold is a preset DC level which is defined as a level at which the effect of at least either the reflection noise or the transmission-to-reception leakage of the reception waveform cannot be ignored.

On the hand, at step S120, if the controller 4 determines the acquired DC level to be less than the threshold value (step S130; NO) a signal process (FFT process) is initiated (step S150). Subsequently, a target distance which is the vehicle base point can be calculated (refer to FIG. 4 (*b*)) from a receiving intensity obtained by the FFT process (Fast Fourier Transformation) showing the frequency spectra by performing a peak search (step S160) that detects the maximum points therein.

<Phase Control Process>

Figure 3:
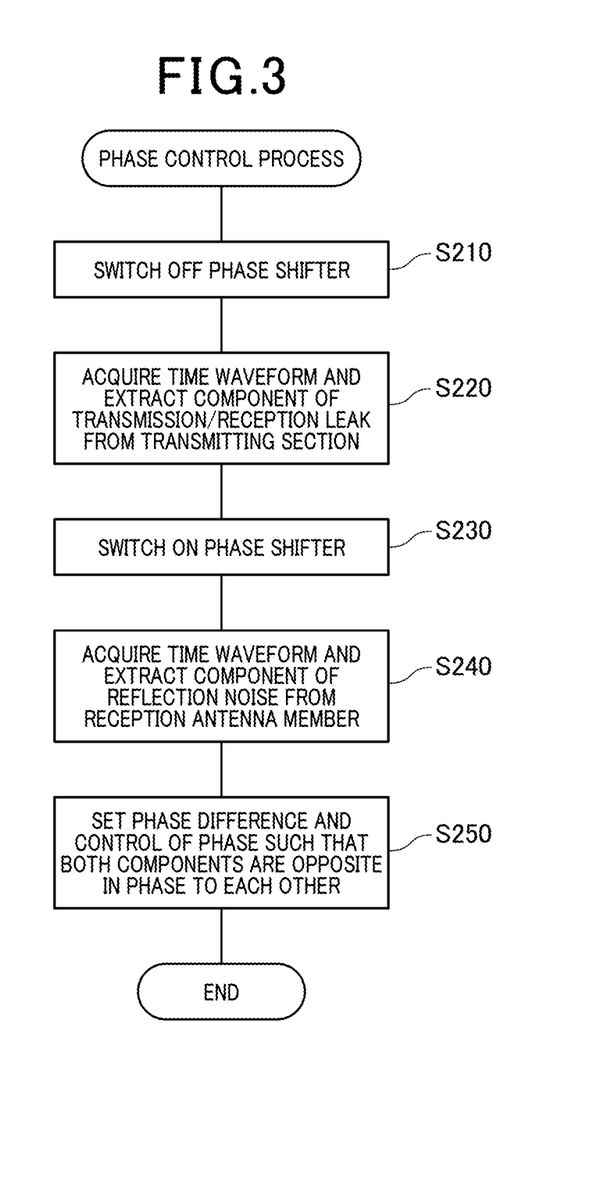
FIG. 3 is a flowchart exemplifying contents of a phase control process performed at step S140 of the noise reduction process shown in FIG. 2.

Next, for step S140 the controller 4 performing the shift control process is explained along with FIG. 3. In this embodiment, the process is performed in an environment (for example, when the vehicle is manufactured, at shipping point, and when, for example, no preceding vehicle exists in a driving environment) where no target exists.

Once the process is initiated, as the controller 4 changes the operating mode from on to off of the phase shifters 31 and 32 (step S210), the supply of radio waves is shut off from the phase shifters 31 and 32 to the antenna elements 11 and 12. As a result, the component of the transmission-to-reception leakage (which is refereed as the second leaking component) leaking from the transmitting section 3 on to the receiving section 6 is extracted (step S220) as the acquired reception waveforms at the previous step 120.

Next, the controller 4 restarts the supply of the radio waves from the phase shifters 31 and 32 to the antenna elements 11 and 12 by switching the mode of the phase shifters 31 and 32 from off to on (step S230). As a result, in the previous step 110, the periodically transmitted radar waves reflect from objects other than the target object (for example, a part of the vehicle). In addition, by receiving the reflected wave at the reception antenna 5 as the reception waveform obtained in the previous step S120, the component of the reflected noise (which is referred as the first leak component) sampled at the receiving section 6 and the previously mentioned transmission-to-reception leakage component (which is referred to the second leak component) are detected as a mixed waveform. The component of the reflection noise is extracted by removing the extracted component of the transmission-to-reception leakage at step S220 from the detected waveform (step S240).

Figure 5:
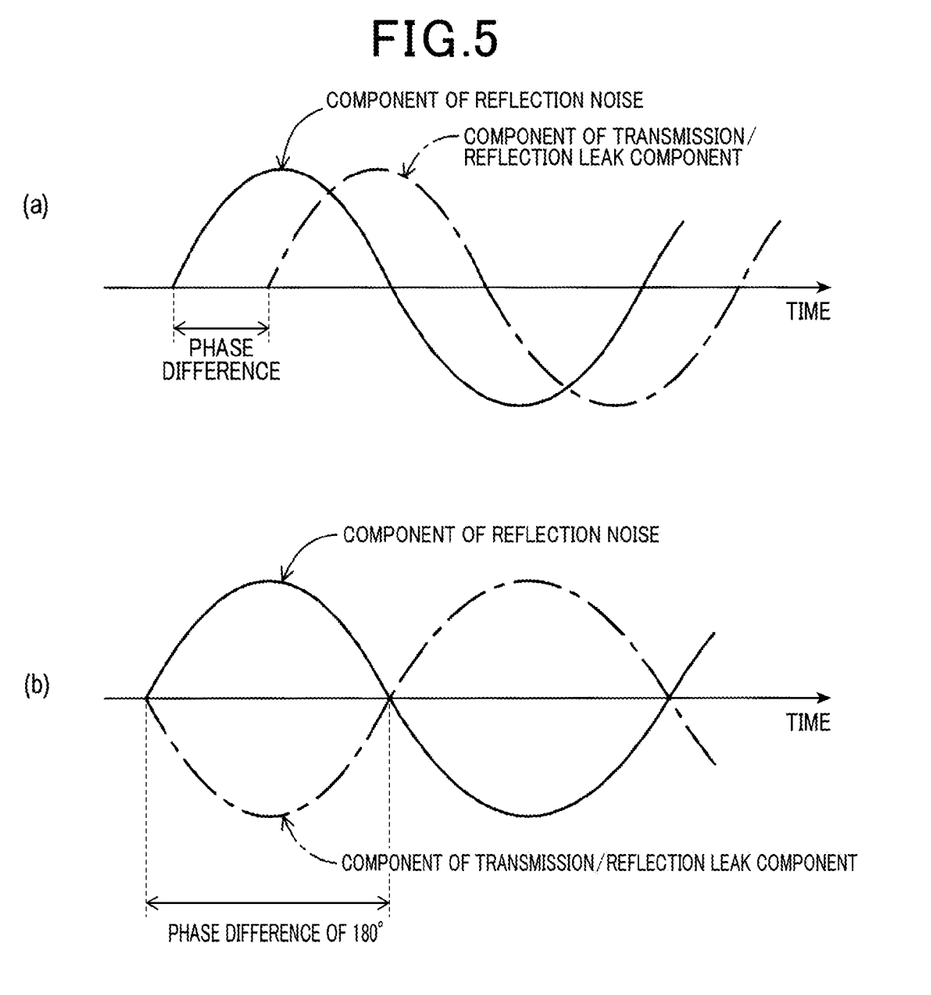

The controller 4 controls the phase of the phase shifter 30 (step S250), such that the phase difference between the component of the transmission-to-reception leakage extracted at step 220 and the component of the reflection noise extracted at step 240 is 180° (that is, the phases of both components are reversed from each other). In the present embodiment, the controller 4 sets the phase difference of the phase shifters 31 and 32 connected to the antenna elements 11 and 12 respectively, by controlling the phase of the phase shifter 30, so that the component of the transmission-to-reception leakage and the component of the reflection noise are reversed relative to each other (refer to FIG. 5 (*b*)).

<Effect>

As explained above, the radar apparatus 1 is provided with the transmission antenna members 2, the transmitting section 3 having the oscillator 10 and the phase shifters 30, the controller 4, the reception antenna member 5, and the receiving section 6. In the configuration, for the noise reduction process, the controller 4 controls the phase of the phase shifter 30 such that, of the received signals generated at receiving section 6 (reception waveforms), the reflected noise components showing the reflected wave from the objects other than the target object outside the vehicle are subtracted from the received signals by using the transmitting/receiving leak components showing the radio waves leaked from the transmitting section 3 to the receiving section 6.

Form this, the phase of the radio waves generated at the oscillator 10 are changed until, of the reception waveforms, the component of the reflection noise and the component of the transmission-to-reception leakage are added together so as to be cancelled out from each other. As a result, individual measures are not taken for the reflection noise and the transmission-to-reception leakage, but both foregoing problems are resolved at the same time.

According to the radar apparatus 1, the effect of the reflection noise and the transmission-to-reception leakage can therefore be efficiently suppressed.

Additionally, in the radar apparatus 1, an on/off switching operation control for the mode of the phase shifters 30 is performed for the phase control process. The component of the reflection noise and the component of the transmission-to-reception leakage are therefore individually extracted, and the phases of the phase shifters 30 are changed so that the extracted component of the reflection noise and the component of the transmission-to-reception leakage are phase reversed to each other.

For this reason, the phase control can be performed based on previously-extracted known reflection noise. As a result, the control time during which the phase of the phase shifter is changed under the try and error method until the component of the reflection noise and the component of the transmission-to-reception leakages are added together so as to be cancelled out from each other, is greatly shortened.

For the radar apparatus 1, the transmission antenna members 2 are provided as the plurality of antenna elements 11 and 12, the transmitting section 3 having the plurality of phase shifters 31 and 32 connected to the plurality of antenna elements 11 and 12, respectively. The radar apparatus 1 is also provided with the distribution device 40. In this configuration, for the phase control process, the controller 4 sets the phase differences of the radio waves for the plurality of phase shifters 31 and 32 (that is, the phase difference of the radar waves transmitted from the antenna elements 11 and 12).

As a result, while the phase differences of the radar waves transmitted from the plurality of antenna elements 11 and 12, respectively, are fixed at predetermined set value, each phase of the plurality of phase shifters 31 and 32 is changeable. A direction of the transmission antenna members 2 can therefore be optionally changed whilst suppressing the effect of the reflection noise and transmission-to-reception leakage. Furthermore, an emission range of the radar can be suitably adjusted.

Other Embodiments

The embodiment for the present invention is described above, however the invention is not limited to the embodiment described herein and can be optionally modified or expanded without departing from the scope of the invention.

For example, in the phase control process for the embodiments described above, the component of the reflection noise and the component of the transmission-to-reception leakage are individually extracted, and the phase of the phase shifter 30 changed so that the component of the reflection noise and the component of the transmission-to-reception leakage extracted is phase reversed, however, the invention is not limited the above described. That is, for example, in the noise reduction process, the phase of the phase shifter 30 can be optionally changed until a DC level of the reception waveform has reached the minimum threshold.

In the radar apparatus 1 according to the embodiments described above, the transmission antenna member 2 is provided with a plurality of antenna elements 11 and 12, however is not limited to the described device described herein. For example, the transmission antenna member 2 may be provided with one antenna element. In this case, one amplifier 20 and phase shifter is desirable and the distribution device 40 unnecessary.

In the noise reduction process according to the embodiments described above, determining an effect of at least either the reflection noise and transmission-to-reception leakage is performed based on the reception waveform before the FFT process, however it is not limited to the above described. For example, the noise reduction process can be performed based on the frequency spectra after the FFT process.

When the radar apparatus 1 includes the known FMCW system, distribution device 40 distributes power from the output of the oscillator 10 to the signal for the transmission and the local signal. The transmission antenna member 2 emits the radio waves as the radar waves in correspondence to the transmitted signal, and the receiving section 6 generates a beat signal (received signal) by mixing the input radar signal from the reception antenna member 5 with the local signal.

REFERENCE SIGNS LIST

1: radar apparatus,
2: transmission antenna member,
3: transmitting section,
4: controller (controlling means),
5: reception antenna member,
6: receiving section,
7: substrate,
10: oscillator,
11 and 12: antenna elements,
20 (21 and 22): amplifier,
30 (31, 32): phase shifter, and
40: distribution device.

What is claimed is:

1. A radar apparatus mounted on a vehicle, the apparatus comprising:
a transmission antenna member which transmits a radar wave;

a transmitting section including;
  an oscillator which generates a radio wave necessary to transmit the radar wave; and
  a phase shifter which changes a phase of the radio wave generated at the oscillator and supplies, the transmission antenna member, to the radio wave whose phase is changed;
controlling means for controlling the phase shifter;
a reception antenna member which receives a reflected wave of the radar wave; and
a reception section which generates a reception signal including the reflected wave received through the reception antenna section,
wherein the controlling means controls the phase of the radio wave such that, of the received signals generated at the receiving section, a first leak component is subtracted from the received signals by using a second leak component, the first leak component indicating the reflection wave reflected from an object other than a target being detected outside the vehicle, the second leak component indicating the radio wave leaking from the transmitter section to the receiving section.

2. The radar apparatus according to claim 1, wherein the controlling means controls the phase control of the radio wave by switching on and off operations of the phase shifter such that the first leak component and the second leak component are extracted individually from the reception signal and the extracted first and second leak components are phase-reversed relative to each other.

3. The radar apparatus according to claim 1, wherein the transmission antenna member includes a plurality of antenna elements;
the phase shifter includes a plurality of phase shifters connected to the plurality of antenna elements, respectively;
the transmission member further includes distributing means which distributes the radio wave generated at the oscillator to the plurality of antenna elements through the plurality of respective phase shifters; and
the controlling means sets a phase difference to the radio waves in the plurality of phase shifters.

4. A method for controlling a radar apparatus that is mounted on a vehicle, the method comprising steps of:
  allowing an oscillator of a transmitting section to generate a radio wave necessary for transmission of a radar wave;
  allowing a phase shifter of the transmitting section to change a phase of the radio wave generated by the oscillator and to supply the phase-changed radio wave to a transmission antenna member;
  allowing controlling means to control the phase shifter;
  allowing the transmission antenna member to transmit the radar wave supplied from the phase shifter;
  allowing a reception antenna member to receive a reflected wave of the radar wave; and
  allowing a receiving section to generate a receiving signal including the reflected wave received via the reception antenna member, wherein the controlling means controls the phase of the radio wave such that, of the received signals generated at the receiving section, a first leak component is subtracted from the received signals by using a second leak component, the first leak component indicating the reflected wave reflected from an object other than a target being detected outside the vehicle, the second leak component indicating the radio wave leaking from the transmitter section to the receiving section.

5. The method for controlling the radar apparatus according to claim 4, wherein
the controlling means controls the phase control of the radio wave by switching on and off operations of the phase shifter such that the first leak component and the second leak component are extracted individually from the reception signal and the extracted first and second leak components are phase-reversed relative to each other.

6. The method for controlling the radar apparatus according to claim 4, wherein
distributing means of the transmission member distributes the radio wave generated at the oscillator to the plurality of antenna elements through a plurality of phase shifters respectively connected to the plurality of antenna elements; and
the controlling means sets a phase difference to the radio waves in the plurality of phase shifters.

7. The radar apparatus according to claim 2, wherein
the transmission antenna member includes a plurality of antenna elements;
the phase shifter includes a plurality of phase shifters connected to the plurality of antenna elements, respectively;
the transmission member further includes distributing means which distributes the radio wave generated at the oscillator to the plurality of antenna elements through the plurality of respective phase shifters; and
the controlling means sets a phase difference to the radio waves in the plurality of phase shifters.

* * * * *